United States Patent
Wu

(10) Patent No.: US 10,830,361 B1
(45) Date of Patent: Nov. 10, 2020

(54) SPREADING CONTROL SWITCH STRUCTURE OF A SPREADER

(71) Applicant: SK & Y AGRICULTURAL EQUIPMENTS CO.,LTD., Fu Hsing Township, Changhua County (TW)

(72) Inventor: Jui-Chang Wu, Fu Hsing Township, Changhua County (TW)

(73) Assignee: SK & Y AGRICULTURAL EQUIPMENTS CO., LTD., Changhua County (TW)

( * ) Notice: Subject to any disclaimer, the term of this patent is extended or adjusted under 35 U.S.C. 154(b) by 0 days.

(21) Appl. No.: 16/540,017

(22) Filed: Aug. 13, 2019

(51) Int. Cl.
| | |
|---|---|
| F16K 3/06 | (2006.01) |
| A01C 15/02 | (2006.01) |
| A01C 15/04 | (2006.01) |
| A01C 7/08 | (2006.01) |
| A45F 3/14 | (2006.01) |
| F16K 3/02 | (2006.01) |
| F16K 31/60 | (2006.01) |
| A01C 7/20 | (2006.01) |

(52) U.S. Cl.
CPC .............. *F16K 3/06* (2013.01); *A01C 7/085* (2013.01); *A01C 7/206* (2013.01); *A01C 15/02* (2013.01); *A01C 15/04* (2013.01); *A45F 3/14* (2013.01); *F16K 3/0254* (2013.01); *F16K 31/602* (2013.01); *A45F 2003/142* (2013.01)

(58) Field of Classification Search
CPC ........ F16K 3/06; F16K 3/0254; F16K 31/602; A01C 7/085; A01C 7/206; A01C 15/02; A01C 15/04; A45F 3/14; A45F 2003/142

USPC .......................................................... 222/175
See application file for complete search history.

(56) References Cited

U.S. PATENT DOCUMENTS

| | | | | | |
|---|---|---|---|---|---|
| 2,892,286 | A | * | 6/1959 | Martin | A01M 9/0061 406/26 |
| 5,339,994 | A | * | 8/1994 | Nuila | A01C 15/02 111/95 |
| 6,089,477 | A | * | 7/2000 | Dillon | A01C 15/02 239/153 |
| 6,729,558 | B1 | * | 5/2004 | Seenauth | B05B 7/1422 239/152 |
| 7,065,944 | B1 | * | 6/2006 | Steele | A01G 20/47 56/1 |
| 7,086,616 | B2 | * | 8/2006 | Murphy | A01C 15/04 239/654 |
| 7,832,663 | B1 | * | 11/2010 | Cotham | A01C 7/02 239/653 |
| 7,837,076 | B2 | * | 11/2010 | Welker | A01M 31/00 222/130 |
| 8,032,980 | B2 | * | 10/2011 | Basenberg, Jr. | A01M 7/0021 15/327.5 |

(Continued)

*Primary Examiner* — Patrick M. Buechner
*Assistant Examiner* — Michael J. Melaragno

(57) ABSTRACT

A spreading control switch structure of a spreader has a spreading tube, a positioning member, a main tube and a switch unit. With the positioning member and the switch unit, the opening and closing state and the spreading amount of the present invention can be adjusted by the circular plate of the valve in the spreading tube. The size of the pipe in the spreading tube is opened to control the blanking amount. On the other hand, the circular plate of the valve can be kept opened in the spreading tube all time without the switching handle being pressed. Therefore, it is easier and less laborious to execute the spreading process.

10 Claims, 8 Drawing Sheets

(56) References Cited

U.S. PATENT DOCUMENTS

| | | | |
|---|---|---|---|
| 8,539,637 B2* | 9/2013 | Basenberg, Jr. | A45F 3/14 15/327.5 |
| 9,072,342 B2* | 7/2015 | Kolb | A44B 11/00 |
| 10,362,723 B2* | 7/2019 | Wu | A01C 7/02 |
| 2004/0031864 A1* | 2/2004 | Johnston | A01C 7/02 239/653 |
| 2010/0230515 A1* | 9/2010 | Wu | B05B 9/0877 239/373 |
| 2010/0252594 A1* | 10/2010 | Basenberg, Jr. | A45F 3/14 224/259 |
| 2010/0327087 A1* | 12/2010 | Harris | A01C 15/02 239/653 |
| 2011/0289718 A1* | 12/2011 | Basenberg, Jr. | A45F 3/14 15/327.5 |
| 2012/0128517 A1* | 5/2012 | Wu | F04B 9/02 417/437 |
| 2015/0115072 A1* | 4/2015 | Reitzel | A01C 7/02 239/654 |
| 2016/0332177 A1* | 11/2016 | Dillon | A01C 15/02 |
| 2019/0200513 A1* | 7/2019 | Wu | A01C 17/008 |

* cited by examiner

SPREADING CONTROL SWITCH STRUCTURE OF A SPREADER

BACKGROUND OF INVENTION

Field of Invention

The present invention relates to a control switch, and more particularly to a spreading control switch structure of a spreader

Description of the Related Art

Currently, conventional spreaders employs a hose to connect to a discharge pipe for sprinkling and spreading materials such as seeds or fertilizer. However, the conventional spreading pipe has a push switch for controlling the opening and closing of the pipeline to control the stopping or ejecting of the material. However, the conventional design employs the elastic member to form a normally closed state, which must be released by the user the whole operation time. Therefore, that is more laborious and the push switch can be accidentally loosened and cause unevenness in the spreading operation.

Therefore, it is desirable to provide a spreading control switch structure of a spreader to mitigate and/or obviate the aforementioned problems.

SUMMARY OF THE INVENTION

An objective of present invention is to provide a spreading control switch structure of a spreader, which is capable of improving the above-mention problems.

In order to achieve the above mentioned objective, a spreading control switch structure of a spreader has: a spreading tube, a positioning member, a main tube and a switch unit. One end of the spreading tube has an assembling opening and another end has a connecting opening. The spreading tube further has a positioning ring at a front portion, a tongue portion disposed between the positioning ring and the connecting opening. The tongue portion has two opposing positioning protrusions, an assembling member is disposed after the positioning ring, and a circular groove is disposed along the spreading tube between the positioning ring and the assembling member. The positioning member has a loop passing the tongue portion and engaging with the positioning ring. The loop further has a fin with a curved slot, the curved slot has a first slider and a second slider, and the first and second sliders are movable in the curved slot and engaged with the curved slot with a stopper. The main tube has one end as an engaging opening jacketed onto the tongue portion of the spreading tube and another end as a distributing opening. The engaging opening is provided with two T-shaped guiding grooves corresponding to the two positioning protrusions, and the two guiding grooves both respectively have a first positioning recess and a second positioning recess. The distributing opening has a semicircular shape, when the main tube is rotated, with engagements between the first and second positioning recesses and the two positioning protrusions, the distributing opening can be rotated 90°. The switch unit has a shaft, an L-shaped switching handle connected to one end of the shaft, and a valve connected to another end of the shaft. The shaft of the switch unit is disposed over the assembling member and enclosed by a cover. The valve has a circular plate inserted into the circular groove. One end of the valve has a guiding arm movable along the curved slot of the positioning member, and another end of the valve has a linkage arm. An elastic member is disposed between the linkage arm and the spreading tube and ejects the switch unit to maintain the valve closing the spreading tube.

Other objects, advantages, and novel features of invention will become more apparent from the following detailed description when taken in conjunction with the accompanying drawings.

DETAILED DESCRIPTION OF THE PREFERRED EMBODIMENT

Figure 1:
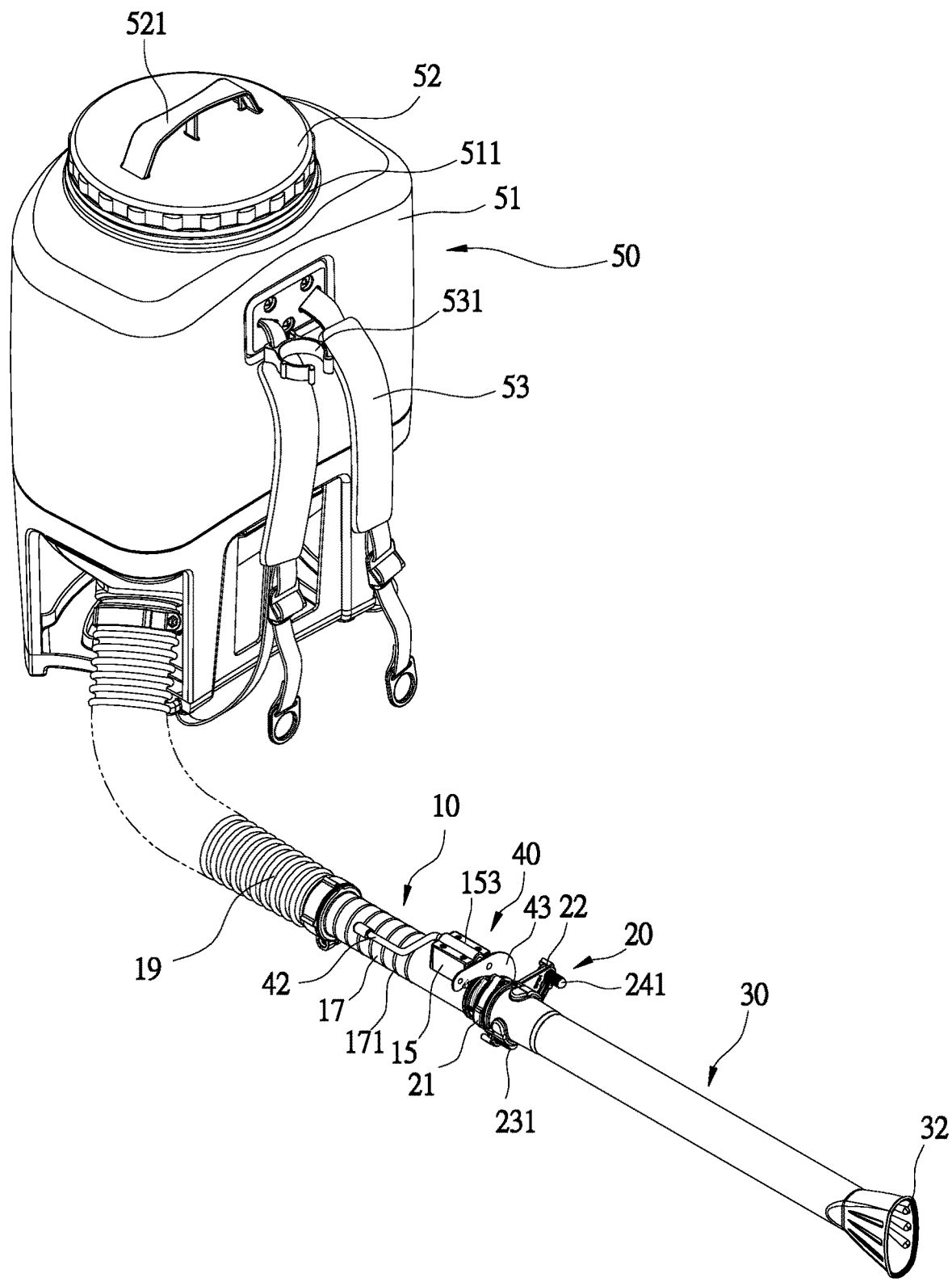
FIG. 1 is a perspective view of a preferred embodiment according to the present invention.
Figure 2:
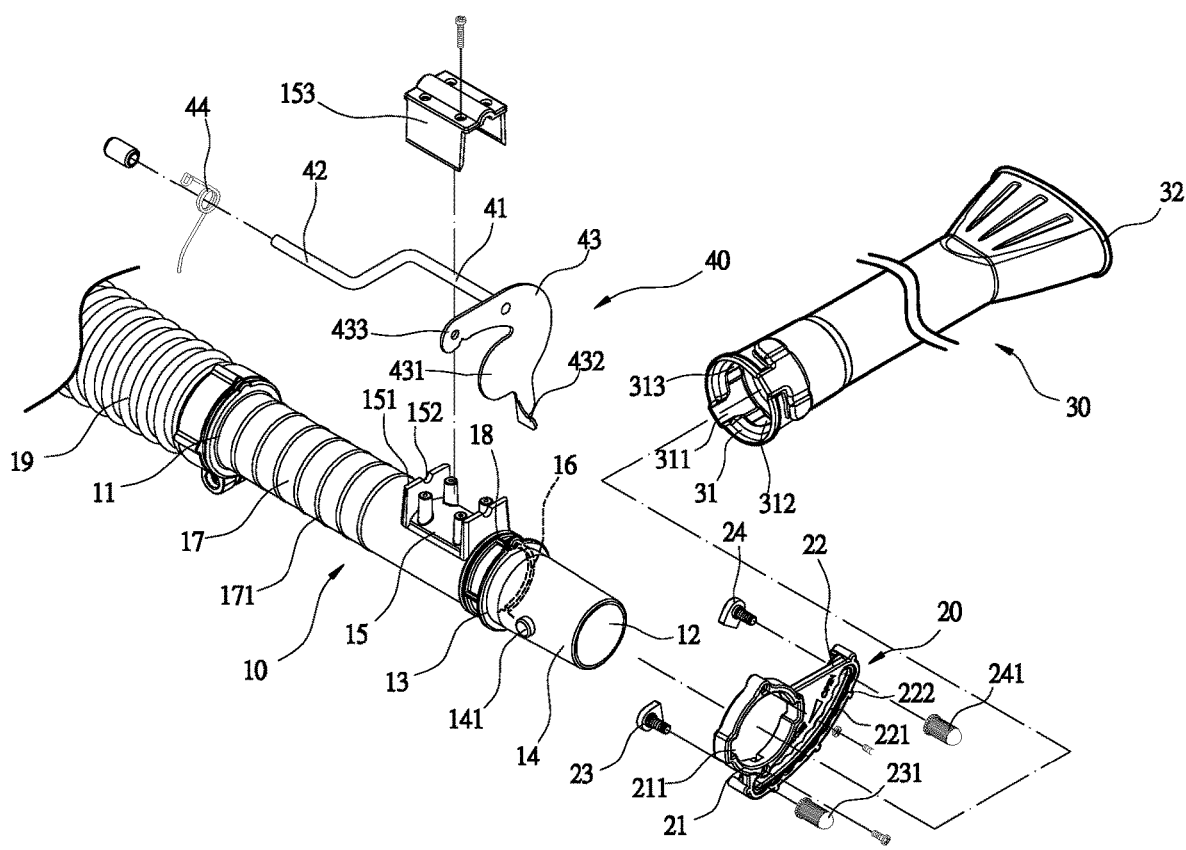
FIG. 2 is an exploded view of the preferred embodiment according to the invention.
Figure 3:
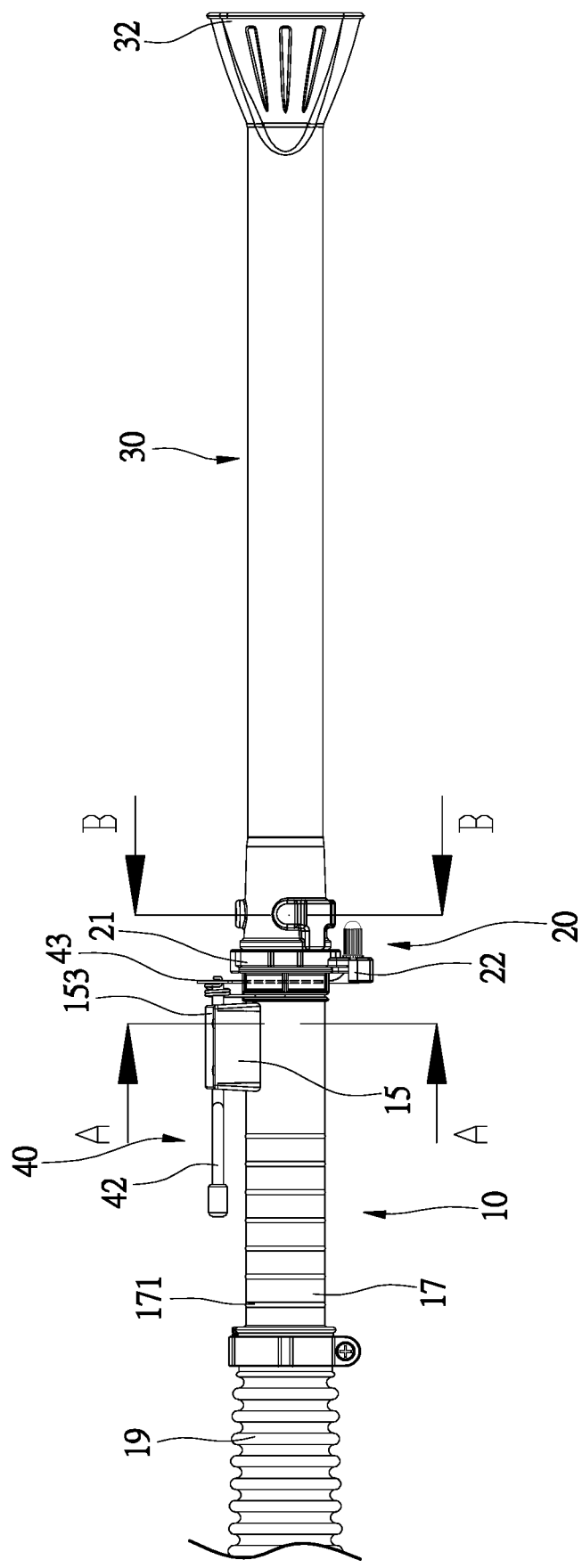
FIG. 3 is a side view of the preferred embodiment according to the invention.

First, please refer to FIGS. 1-3. A spreading control switch structure of a spreader comprises: a spreading tube 10, a positioning member 20, a main tube 30 and a switch unit 40.

One end of the spreading tube 10 has an assembling opening 1 1and a connecting opening 12 at another end. The spreading tube 10 further comprises a positioning ring 13 at a front portion, and a tongue portion 14 is disposed between the positioning ring 13 and the connecting opening 12. The tongue portion 14 comprises two opposing positioning protrusion 141, and an assembling member 15 is disposed after the positioning ring 13. The assembling member 15 further has two parallel position members 151, and the two position members 151 are provided with two position recesses 151 at their ends. A circular groove 16 is disposed along the spreading tube 10 between the positioning ring 13 and the assembling member 15. A holding portion 17 is provided between the assembling opening 11 of the spreading tube 10 and the assembling member 15, and the holding portion 17 has a plurality of circular ribs 171.

The positioning member 20 has a loop 21 passing the tongue portion 14 and engaging with the positioning ring 13, and the loop 21 further two opposing concaves 211 for accepting the two positioning protrusions 141 of the tongue portion 14. The loop 21 further comprises a fin 22 with a curved slot 221, the curved slot 221 comprises a first slider 23 and a second slider 24, and the first and second sliders 23, 24 are movable in the curved slot 221 and engaged with the curved slot 221 with a stopper 231, 241. The fin 22 of the positioning member 20 further has a plurality of positioning niches 222 along the curved slot 221 for being engaged with the stopper 231, 241.

The main tube 30 has one end as an engaging opening 31 jacketed onto the tongue portion 14 of the spreading tube 10 and another end as a distributing opening 32. The engaging opening 31 is provided with two T-shaped guiding grooves 311 corresponding to the two positioning protrusions 141, and the two guiding grooves 311 both respectively have a first positioning recess 312 and a second positioning recess 313. The distributing opening 32 has a semicircular shape, when the main tube 30 is rotated, with engagements between the first and second positioning recesses 312, 313 and the two positioning protrusions 141, the distributing opening 32 can be rotated 90°.

The switch unit 40 comprises a shaft 41, an L-shaped switching handle 42 connected to one end of the shaft 41, and a valve 43 connected to another end of the shaft 41. The shaft 41 of the switch unit 40 is disposed over the assembling member 15 and enclosed by a cover 153. The valve 43 has a circular plate 431 inserted into the circular groove 16 and controlled by the switching handle 42. Furthermore, one end of the valve 43 has a guiding arm 432 movable along the curved slot 221 of the positioning member 20, and another end of the valve has a linkage arm 433. An elastic member 44 is disposed between the linkage arm 433 and the spreading tube 10. The spreading tube 10 further has a positioning circular groove 18 adjacent to the positioning ring 13, the elastic member 44 is jacketed onto the shaft 41, and one end of the elastic member 44 is fixed to the linkage arm 433 and another end is limited in the positioning circular groove 18.

Figure 4:
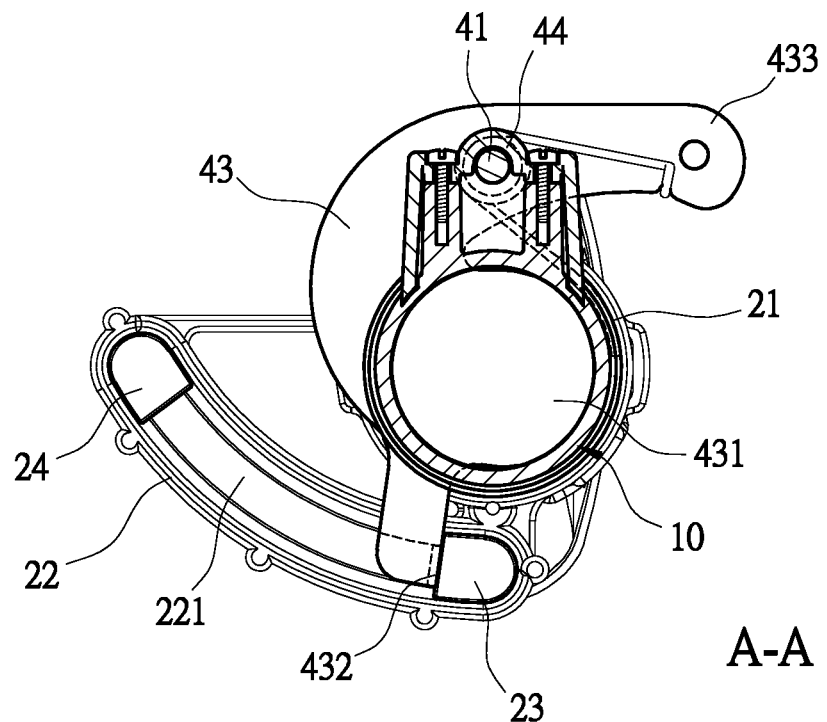
FIG. 4 is a cross-sectional view showing the closed state corresponding to the line A-A shown in FIG. 3 of the preferred embodiment according to the present invention.
Figure 5:
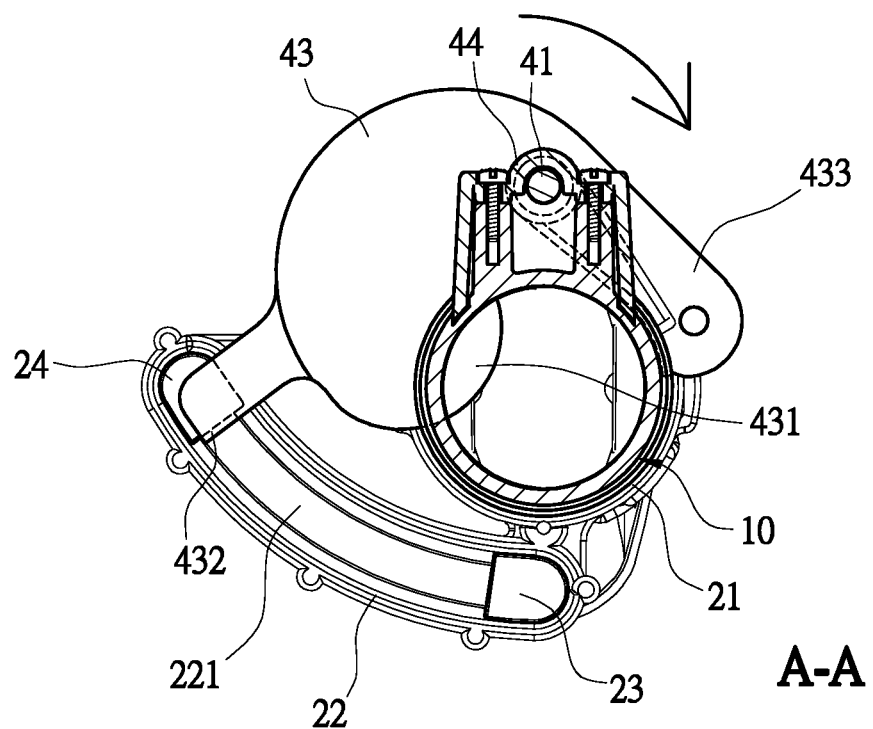
FIG. 5 is a cross-sectional view showing the open state corresponding to the line A-A shown in FIG. 3 of the preferred embodiment according to the present invention.

For the assembly, please refer to FIGS. 1, 2 and 3 with FIGS. 4 and 5. The positioning member 20 is attached to the tongue portion 14 of the spreading tube 10 with the loop 21 and fixed to the positioning ring 13. The fin 22 of the positioning member 20 is disposed at the same side as the circular member 16, such that the curved slot 221 of the fin 22 and the circular groove 16 have the same movement distances. The shaft 41 of the switch unit 40 is disposed over the position recess 152 of the assembling member 15, and the circular plate 431 of the valve 43 is inserted into the circular groove 16 of the spreading tube 10. The guiding arm 432 is placed In the curved slot 221 of the fin 22, such that the movement of the circular plate 431 is limited by the displacement distance of the guiding arm 432 in the curved slot 221. Finally, the cover 153 covers the assembly member 15 to position the unit 40, the elastic member 44 sleeved on the shaft 41 has one end fixed to the linkage arm 433 and the other end limited in the positioning circular groove 18, and the switch unit 40 is ejected by the elastic member 44, so the circular plate 431 of the valve 43 closes up the spreading tube 10. The engaging opening 31 of the main tube 30 is mounted with the tongue portion 14 of the spreading tube 10 and the two guiding grooves 311 pass through the two opposing positioning protrusion 141 of the tongue portion 14. Finally, the main tube 30 is locked to the spreading tube 10 by rotation.

For actual use, please refer to FIGS. 1, 2, and 3 with FIGS. 4, 5, 6, and 7. The assembly opening 11 of the spreading tube 10 is mounted onto a flexible tube 19 connected to a spreader 50. The spreader 50 has a storage tank 51, and the storage tank 51 has a loading opening 511 for filling with seeds, fertilizers, etc. The loading opening 511 is further provided with a screw cap 52, and the upper surface of the screw cap 52 is provided with a trapezoidal pull handle 521 for opening and closing rotations. When the user holds the spreading tube 10, the circular plate 431 closes inside of the spreading tube 10 because the valve 43 is normally pushed by the elastic member 44. The guiding arm 432 is located on the one end of the curved slot 221 and against the first slider 23. In order to unblock the spreading tube 10, the switching handle 42 is pressed and the valve 43 is moved to make the circular late 431 to be released from the circular groove 16, and the amount of output is controlled by the extent of the circular plate 431. Furthermore, the guiding arm 432 moves along the curved slot 221 of the positioning member 20 to indicate the current shielding range of the circular plate 431 in the spreading tube 10 by the position of the guiding arm 432 in the curved slot 221, thereby achieving the purpose of controlling the spreading amount. When the maximum spreading amount is achieved, the guiding arm 432 is located at the other end of the curved slot 221 and abuts against the second slider 24. Meanwhile, the linkage arm 433 has a block effect on the spreading tube 10 to prevent the user from exerting excessive force and damaging the switch unit 40 and the positioning member 20.

Figure 6:
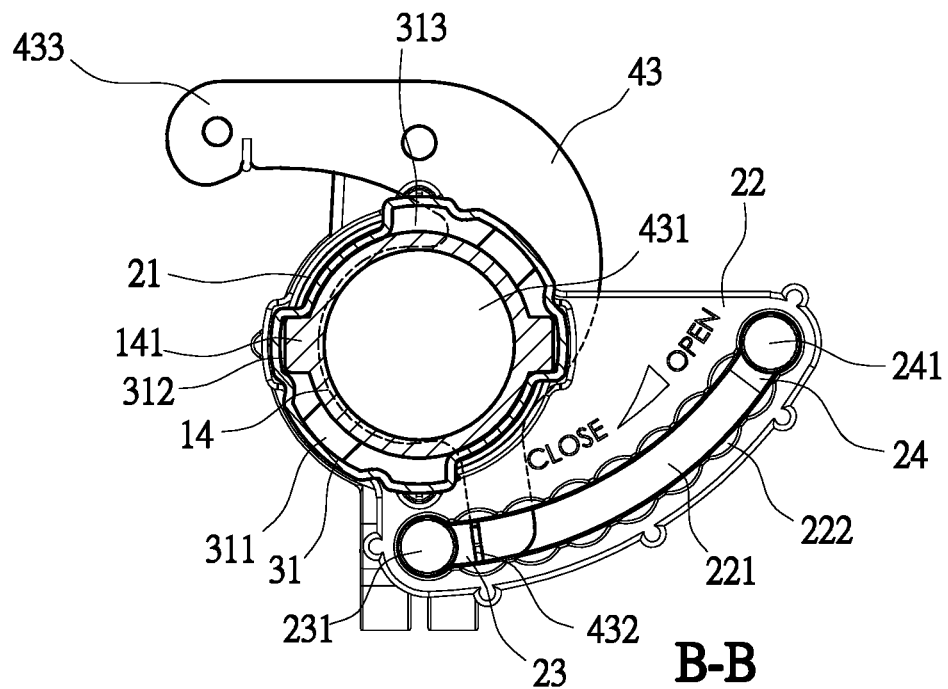
FIG. 6 is a cross-sectional view showing the closed state of the line corresponding to the line B-B shown in FIG. 3 of the preferred embodiment according to the present invention.
Figure 7:
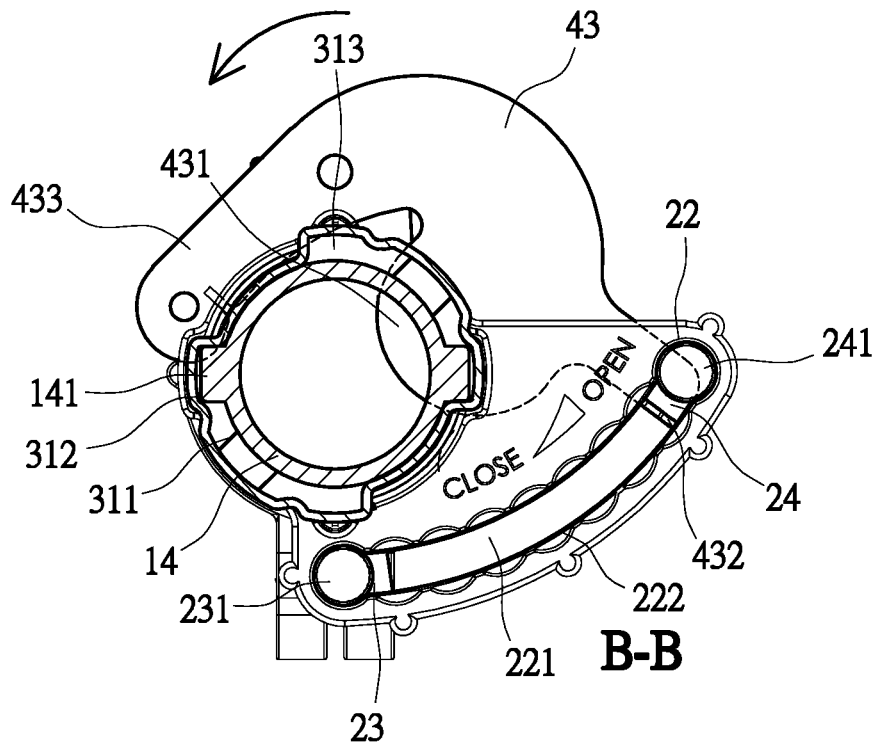
FIG. 7 is a cross-sectional view showing the opening state of the line corresponding to the line B-B shown in FIG. 3 of the preferred embodiment according to the present invention.
Figure 8:
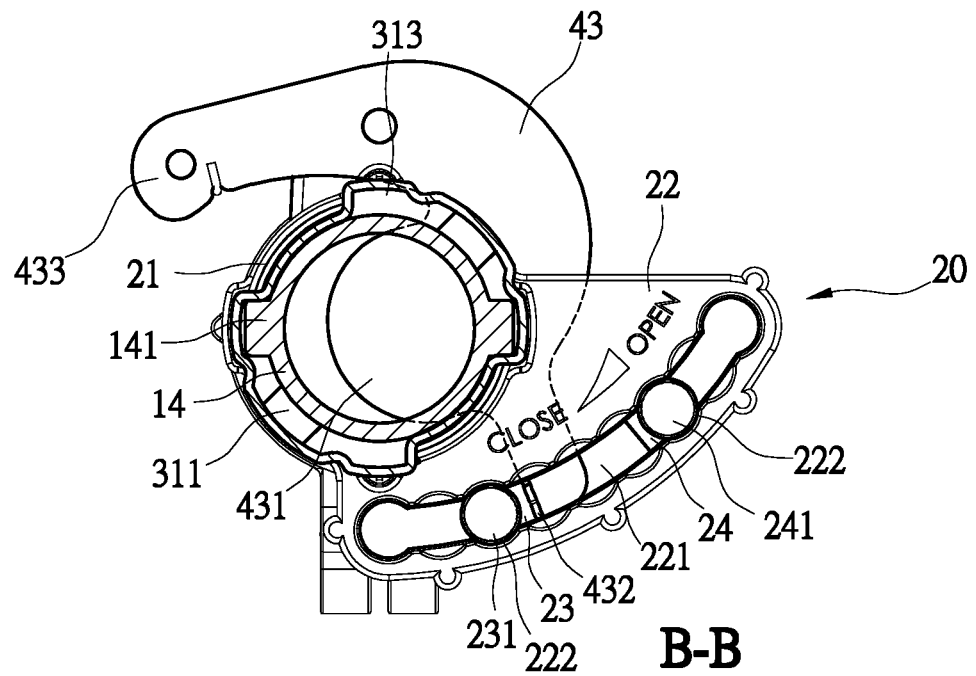
FIG. 8 is a cross-sectional view showing a normally open state corresponding to a line taken along line B-B shown in FIG. 3 of the preferred embodiment according to the present invention.

Further, in order to keep the circular plate 431 of the valve 43 not blocking opened in the spreading tube 10, please refer to the FIGS. 6 and 8, the switching handle 42 is pressed, the guiding arm 432 moves away from the first slider 23, the circular plate 431 is rotated, and then the stopper 231 of the first slider 23 is released and the first slider 23 is moved along the curved slot 221. Then the stopper 231 is locked in the curved slot 221 and restrained in one of positioning niches 222. Therefore, when the user releases the switching handle 42 to be ejected by the elastic member 44, the guiding arm 432 is subject to be restricted by the first slider 23 and cannot be completely displaced to the end of the curved slot 221, so that the circular plate 431 cannot completely block the spreading tube 10 to form a normally open state. Alternatively, by adjusting the positions of the first slider 23 and the stopper 231 base on spreading demand, the current shielding range of the circular plate 431 can be controlled. It also allows the user to evenly squirt the material by swinging the spreading tube 10 left and right as more convenient operation.

Figure 9:
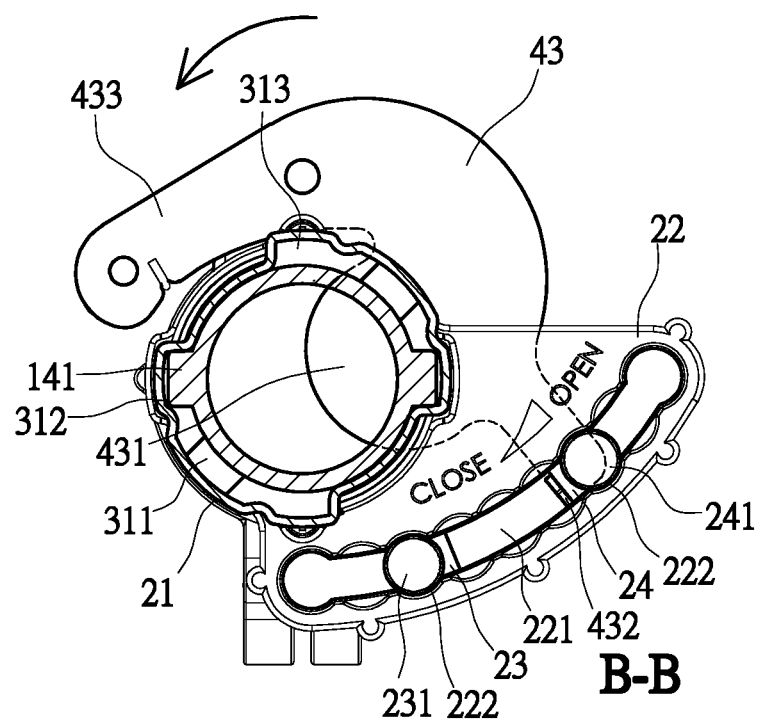
FIG. 9 is a cross-sectional view showing the restricted opening state of the line corresponding to the line B-B shown in FIG. 3 of the preferred embodiment according to the present invention.

Further, in order to adjust the shielding range of the circular plate 431 of the valve 43 in the spreading tube 10, please also refer to the FIGS. 6 and 9, the stopper 241 of the second slider 24 is released, the second slider 24 is moved along the curved slot 221, and the stopper 241 is locked in the curved slot 221 and restrained in one of positioning niches 222. When the user presses the switching handle 42 to move the valve 43, the second slider 24 and the stopper 241 limit and shorten the movement distance of the guiding arm 432, thereby limiting the opening range of the circular plate 431 of the valve 43 in the spreading tube 10, and the spreading amount is controlled.

Figure 10:
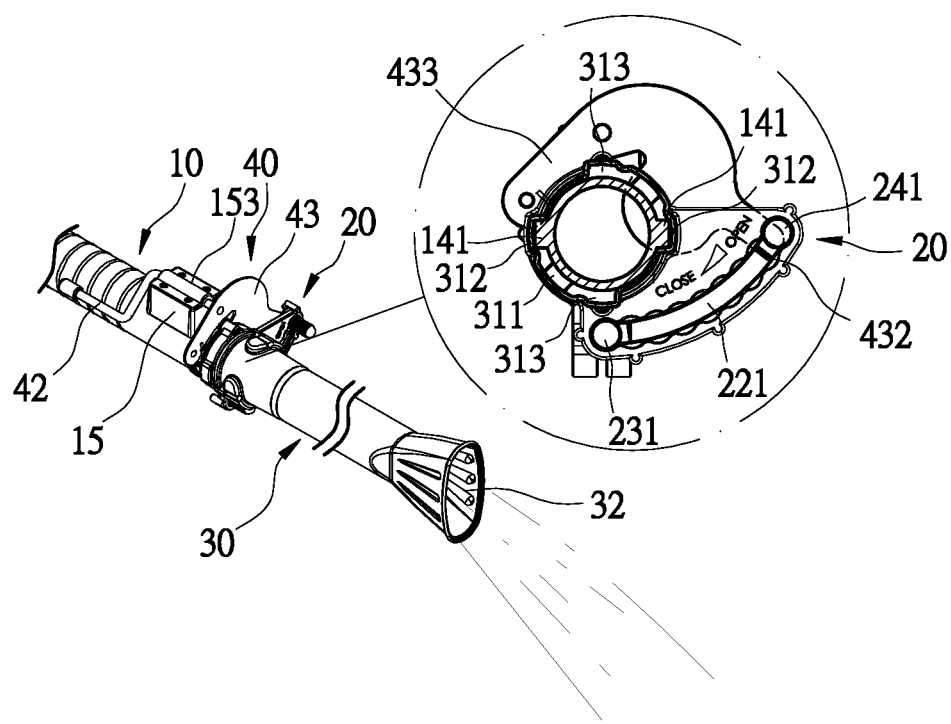
FIG. 10 is a schematic view showing the vertical direction of the main tube of the preferred embodiment according to the present invention.
Figure 11:
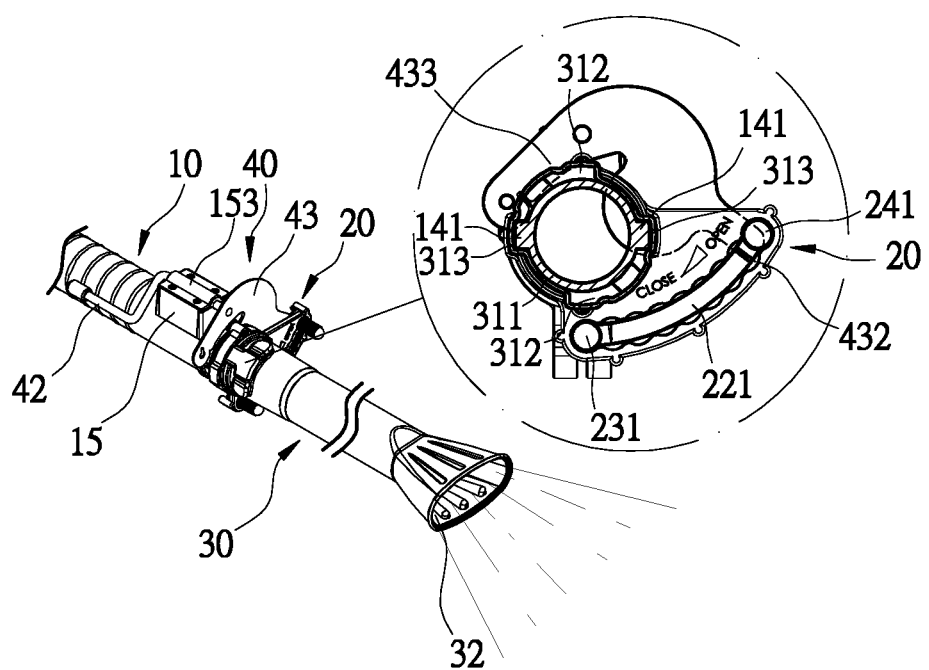
FIG. 11 is a schematic view showing the horizontal formation of the main tube by the rotation of the preferred embodiment according to the present invention.

In addition, the main tube 30 can be rotated 90° on the tongue portion 14 of the spreading tube 10 to rotate the distributing opening 32 as vertical or horizontal. When the main tube 30 is rotated, the two guiding grooves 311 of the engaging opening 31 move along the two positioning protrusions 141 and are restrained by the first positioning recess 312 or the second positioning recess 313 against the positioning protrusion 141. When the two positioning protrusions 141 push the first positioning recess 311 of the two guiding grooves 311, as shown in FIG. 10, the distributing opening 32 is vertical, so that the material is limited to the frontal spreading operation. Alternatively, when the two positioning protrusions 141 push against the second positioning recess 313 of the two guiding grooves 311, as shown in FIG. 11, the distributing opening 32 is turned horizontally, so that the material can be sprayed to the left and right to increase the spreading area.

Figure 12:
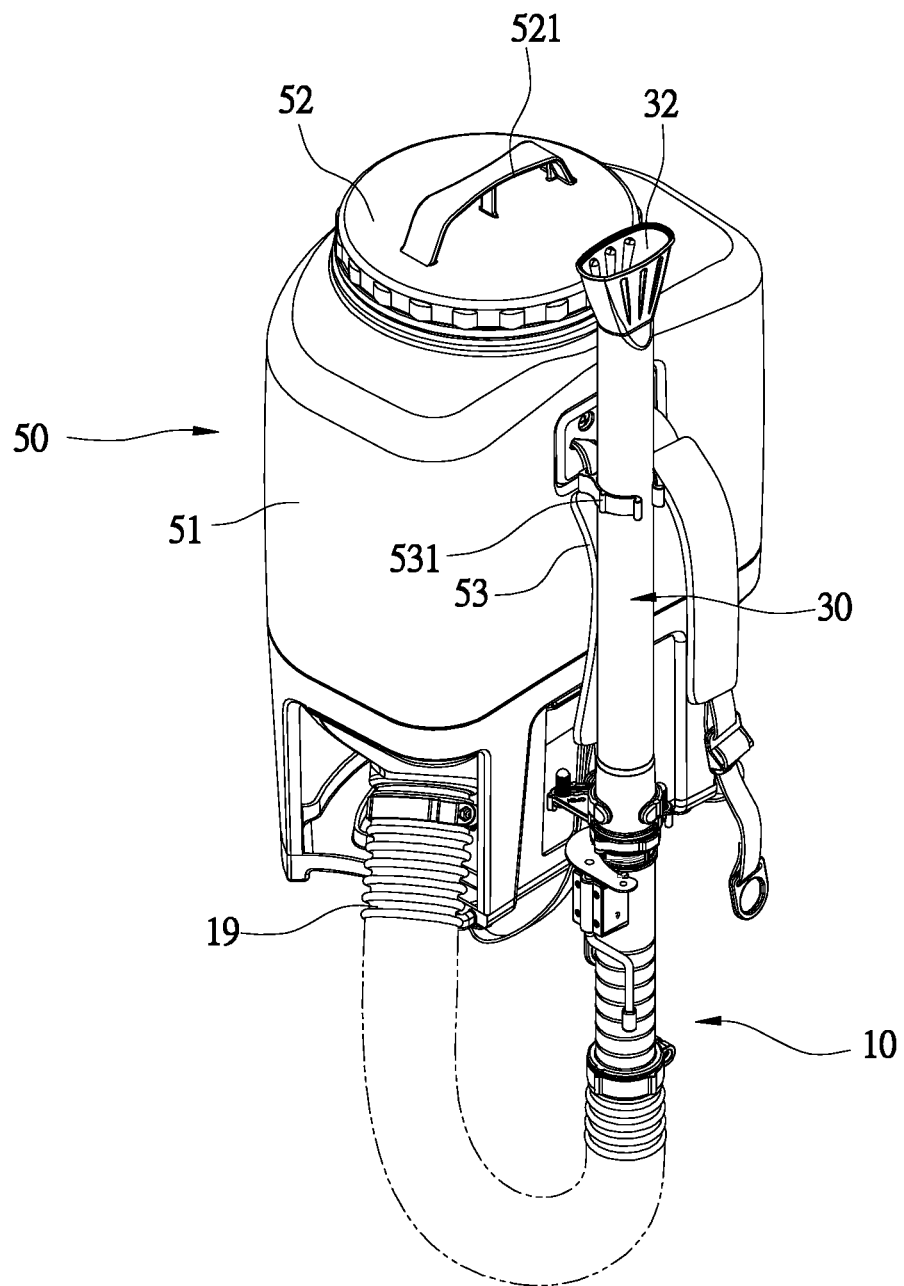
FIG. 12 is a schematic view showing the use of a snap fastener of the preferred embodiment according to the present invention.

The spreader 50 is further provided with two shoulder straps 53 for carrying by the user, and a shoulder stripe strap 53 has a C-shaped buckle 531, as shown in FIG. 12, so that the user can attach the spreading tube 10 onto the C-shaped buckle 531 to avoid long-time holding and improve convenience.

According to the structure of the above specific embodiment, the following benefits can be obtained: with the positioning member 20 and the switch unit 40, the opening and closing state and the spreading amount of the present invention can be adjusted by the circular plate 431 of the valve 43 in the spreading tube 10. The size of the pipe in the spreading tube 10 is opened to control the blanking amount. On the other hand, the circular plate 431 of the valve 43 can be kept opened in the spreading tube 10 all time without the switching handle 42 being pressed. Therefore, it is easier and less laborious to execute the spreading process.

Although the present invention has been explained in relation to its preferred embodiment, it is to be understood that many other possible modifications and variations can be made without departing from the spirit and scope of invention as hereinafter claimed.

What is claimed is:

1. A spreading control switch structure of a spreader comprising:
   a spreading tube, one end of the spreading tube having an assembling opening and another end having a connecting opening, the spreading tube further comprising a positioning ring at a front portion, a tongue portion disposed between the positioning ring and the connecting opening, the tongue portion comprising two opposing positioning protrusions, an assembling member disposed after the positioning ring, and a circular groove disposed along the spreading tube between the positioning ring and the assembling member;
   a positioning member having a loop passing the tongue portion and engaging with the positioning ring, the loop further comprising a fin with a curved slot, the curved slot comprising a first slider and a second slider, the first and second sliders movable in the curved slot and engaged with the curved slot with a stopper;
   a main tube having one end as an engaging opening jacketed onto the tongue portion of the spreading tube and another end as a distributing opening, the engaging opening provided with two T-shaped guiding grooves corresponding to the two positioning protrusions, the two guiding grooves both respectively having a first positioning recess and a second positioning recess, the distributing opening having a semicircular shape, when the main tube is rotated, with engagements between the first and second positioning recesses and the two positioning protrusions, the distributing opening can be rotated 90°; and
   a switch unit comprising a shaft, an L-shaped switching handle connected to one end of the shaft, and a valve connected to another end of the shaft, the shaft of the switch unit disposed over the assembling member and enclosed by a cover, the valve having a circular plate inserted into the circular groove; one end of the valve having a guiding arm movable along the curved slot of the positioning member, another end of the valve having a linkage arm, an elastic member disposed between the linkage arm and the spreading tube ejecting the switch unit to maintain the valve closing the spreading tube.

2. The spreading control switch structure of a spreader as claimed in claim 1, wherein the assembling opening of the spreading tube is mounted with a flexible tube for connecting to the spreader.

3. The spreading control switch structure of a spreader as claimed in claim 2, wherein the spreader comprises a storage tank having a loading opening on a top thereof, and the loading opening further has a screw cap with a handle.

4. The spreading control switch structure of a spreader as claimed in claim 1, wherein a holding portion is provided between the assembling opening of the spreading tube and the assembling member, and the holding portion has a plurality of circular ribs.

5. The spreading control switch structure of a spreader as claimed in claim 1, wherein the assembling member further has two parallel position members, and the two position members are provided with two position recesses at their ends for positioning the shaft of the switch unit.

6. The spreading control switch structure of a spreader as claimed in claim 1, wherein the loop of the positioning member further has two opposing concaves for accepting the two positioning protrusions of the tongue portion.

7. The spreading control switch structure of a spreader as claimed in claim 1, wherein the fin of the positioning member further has a plurality of positioning niches along the curved slot.

8. The spreading control switch structure of a spreader as claimed in claim 1, wherein the spreading tube further has a positioning circular groove adjacent to the positioning ring, the elastic member is jacketed onto the shaft, and one end of the elastic member is fixed to the linkage arm and another end is limited in the positioning circular groove.

9. The spreading control switch structure of a spreader as claimed in claim 1, wherein the linkage arm is also configured to stop the spreading tube.

10. The spreading control switch structure of a spreader as claimed in claim 1, wherein the spreader further has two shoulder straps, and a C-shaped buckle for securing the spreading tube.

* * * * *